(12) United States Patent
Pan et al.

(10) Patent No.: US 12,528,507 B2
(45) Date of Patent: *Jan. 20, 2026

(54) SYSTEMS AND METHODS FOR VISION-LANGUAGE PLANNING (VLP) FOUNDATION MODELS FOR AUTONOMOUS DRIVING

(71) Applicant: Robert Bosch GmbH, Stuttgart (DE)

(72) Inventors: Chenbin Pan, Syracuse, NY (US); Burhaneddin Yaman, San Jose, CA (US); Tommaso Nesti, Mountain View, CA (US); Abhirup Mallik, Santa Clara, CA (US); Yuliang Guo, Palo Alto, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 147 days.

This patent is subject to a terminal disclaimer.

(21) Appl. No.: 18/388,606

(22) Filed: Nov. 10, 2023

(65) Prior Publication Data

US 2025/0153736 A1 May 15, 2025

(51) Int. Cl.
*B60W 60/00* (2020.01)
*G06V 20/56* (2022.01)

(52) U.S. Cl.
CPC ......... *B60W 60/0015* (2020.02); *G06V 20/56* (2022.01); *B60W 2420/403* (2013.01)

(58) Field of Classification Search
CPC ........ B60W 60/0015; B60W 2420/403; G06V 20/56; G06V 10/82; G05D 1/0248; G05D 1/0219; G06F 40/284
See application file for complete search history.

(56) References Cited

U.S. PATENT DOCUMENTS 12,158,762 B1 * 12/2024 O'Hara ................. G06F 40/284
2022/0230016 A1 7/2022 Ahamed et al.
(Continued)

FOREIGN PATENT DOCUMENTS

| CN | 111002980 A | 4/2020 |
|---|---|---|
| CN | 114071013 B | 6/2023 |
| DE | 102020202476 A1 | 8/2021 |

OTHER PUBLICATIONS

Learning Transferable Visual Models From Natural Language Supervision, to Radford et al. pp. 1-48 published Feb. 2021 (Year: 2021).*
(Continued)

*Primary Examiner* — Kenneth J Malkowski
(74) *Attorney, Agent, or Firm* — Dickinson Wright PLLC

(57) ABSTRACT

Methods and systems for training an autonomous driving system using a vision-language planning (VLP) model. Image data is obtained from a vehicle-mounted camera, encompassing details about agents situated within the external environment. Via image processing, the system identifies these agents within the environment. A Bird's Eye View (BEV) representation of the surroundings is then generated, encapsulating the spatiotemporal information linked to the vehicle and the recognized agents. Execution of the VLP machine learning model begins by extracting vision-based planning features from the BEV, and receiving or generating textual information characterizing various attributes of the vehicle within the environment. Text-based planning features are extracted from this textual information. To enhance model performance, a contrastive learning model is engaged to establish similarities between the vision-based and text-based planning features, and a predicted trajectory is output based on the similarities.

20 Claims, 8 Drawing Sheets

(56) References Cited

U.S. PATENT DOCUMENTS

| | | | |
|---|---|---|---|
| 2022/0332317 A1 | 10/2022 | Lewandowski et al. | |
| 2023/0252795 A1* | 8/2023 | Tong | G06V 10/40 382/104 |
| 2023/0278587 A1 | 9/2023 | Wu | |
| 2024/0087136 A1 | 3/2024 | Waez et al. | |
| 2024/0300490 A1 | 9/2024 | Yang et al. | |

OTHER PUBLICATIONS

Xiao et al., "APPLD: Adaptive Planner Parameter Learning From Demonstration," IEEE Robotics and Automation Letters, vol. 5, No. 3, Jul. 2020, 7 pages.

Larson et al., "Derivative-free optimization methods," arXiv:1904.11585v2 [math.OC] Jun. 25, 2019, 94 pages.

Hu et al., "Planning-oriented Autonomous Driving," Computer Vision Foundation, 10 pages.

Radford et al., "Learning Transferable Visual Models From Natural Language Supervision," Proceedings of the 38th International Conference on Machine Learning, PMLR 139, 2021, 16 pages.

Jaime Fernandez, "Error Metrics for Trajectory Prediction Accuracy", Feb. 7, 2019, Wordpress (Year: 2019).

Mrinal Kalakrishnan et al., "STOMP: Stochastic Trajectory Optimization for Motion Planning", May 13, 2011, IEEE, pp. 4569-4574 (Year: 2011).

Yukang Kou and Changxi Ma, "Dual-objective intelligent vehicle lane changing trajectory planning based on polynomial optimization", Mar. 9, 2023, Elsevier, No. 128665, pp. 1-16 (Year: 2023).

Sampurna Mandal et al., "Motion Prediction for Autonomous Vehicles from Lyft Dataset using Deep Learning", Oct. 31, 2010, IEEE, 5th ICCCA, pp. 768-773 (Year: 2010).

Nathan Ratliff et al., "CHOMP: Gradient Optimization Techniques for Efficient Motion Planning", May 17, 2009, IEEE, pp. 489-494 (Year: 2009).

Rahel Vortmeyer-Kley et al., "A trajectory based loss function to learn missing terms in bifurcating dynamical systems", 2011, Scientific Reports, pp. 1-13 (Year: 2011).

Olov Andersson et al., "Model-Predictive Control with Stochastic Collision Avoidance using Bayesian Policy Optimization", May 21, 2016, IEEE, 2016 ICRA, pp. 4597-4604 (Year: 2016), 8 Pages.

* cited by examiner

SYSTEMS AND METHODS FOR VISION-LANGUAGE PLANNING (VLP) FOUNDATION MODELS FOR AUTONOMOUS DRIVING

TECHNICAL FIELD

The present disclosure relates to systems and methods for vision-language planning (VLP) foundation models for autonomous driving.

BACKGROUND

An autonomous vehicle, often referred to as a self-driving or driverless vehicle, is a type of vehicle capable of navigating and operating on roads and in various environments without direct human control. Autonomous vehicles use a combination of advanced technologies and sensors to perceive their surroundings, make decisions, and execute driving tasks.

Autonomous vehicles are typically equipped with a variety of sensors, including lidar, radar, cameras, ultrasonic sensors, and sometimes additional technologies like GPS and IMUs (Inertial Measurement Units). These sensors provide real-time data about the vehicle's surroundings, including the positions of other vehicles, pedestrians, road signs, and road conditions. The vehicle's onboard computers use data from sensors to create a detailed map of the environment and to perceive objects and obstacles. This information is essential for navigation and collision avoidance.

Machine learning (ML) and artificial intelligence (AI) play a crucial role in autonomous vehicles. Deep learning algorithms are used for tasks like object detection, lane keeping, and decision-making, and can rely on image processing to perform these tasks. These algorithms enable the vehicle to understand and respond to complex and dynamic traffic situations.

SUMMARY

In one embodiment, a method for training an autonomous driving system, leveraging a Vision-Language Planning (VLP) machine learning model, is provided. The method begins by receiving image data obtained from a vehicle-mounted camera, encompassing details about agents situated within the external environment. Via image processing, the system identifies these agents within the environment. A Bird's Eye View (BEV) representation of the surroundings is then generated, encapsulating the spatiotemporal information linked to the vehicle and the recognized agents. A vision-language planning (VLP) machine learning model is then executed, which conducts several actions. It extracts vision-based planning features from the BEV, encompassing the spatiotemporal data pertaining to the vehicle's location and the agents in the vicinity. Also, the model generates textual information characterizing various attributes of the vehicle within the environment. This text information is subsequently employed to derive text-based planning features. To enhance model performance, a contrastive learning model is engaged to establish similarities between the vision-based and text-based planning features. A predicted trajectory of the vehicle is generated based on the similarities.

In another embodiment, a system utilizing a vision-language planning (VLP) machine learning model is provided. The system includes a camera mounted to a vehicle and configured to generate image data associated with agents in an environment outside the vehicle. The system also includes a processor, and memory including instructions that, when executed by the processor, cause the processor to perform the following: process the image data to detect the agents in the environment: generate a bird eye view (BEV) of the environment based on the image data, wherein the BEV includes spatiotemporal information associated with the vehicle and the detected agents; and execute a vision-language planning (VLP) machine learning model to perform the following: extract vision-based planning features from the BEV, wherein the vision-based planning features include the at least some of the spatiotemporal information associated with the vehicle, receive text information associated with the environment, wherein the text information describes qualities of the vehicle in the environment, extract text-based planning features from the text information, execute a contrastive learning model to derive similarities between the vision-based planning features and the text-based planning features, and generate a predicted trajectory of the vehicle based on the similarities.

In another embodiment, a method of training an autonomous driving system includes the following: receiving image data generated from a camera mounted to a vehicle, wherein the image data includes agents in an environment outside the vehicle: generating a bird eye view (BEV) of the environment based on the image data, wherein the BEV includes spatiotemporal information associated with the vehicle and the agents: based on the BEV, executing a perception model to detect the agents in the environment and associated information about the detected agents: based on the BEV, executing a prediction model to estimate trajectories of the detected agents: based on the BEV, executing a vision-language planning (VLP) model to output a predicted trajectory of the vehicle, wherein the VLP model is configured to: extract vision-based planning features from the BEV, wherein the vision-based planning features include the spatiotemporal information associated with the vehicle, receive text information associated with the environment, wherein the text information describes qualities of one or more of the agents in the environment, extract text-based planning features from the text information, perform contrastive learning to derive similarities between the vision-based planning features and the text-based planning features, and output the predicted trajectory based on the similarities.

DETAILED DESCRIPTION

Figure 1:
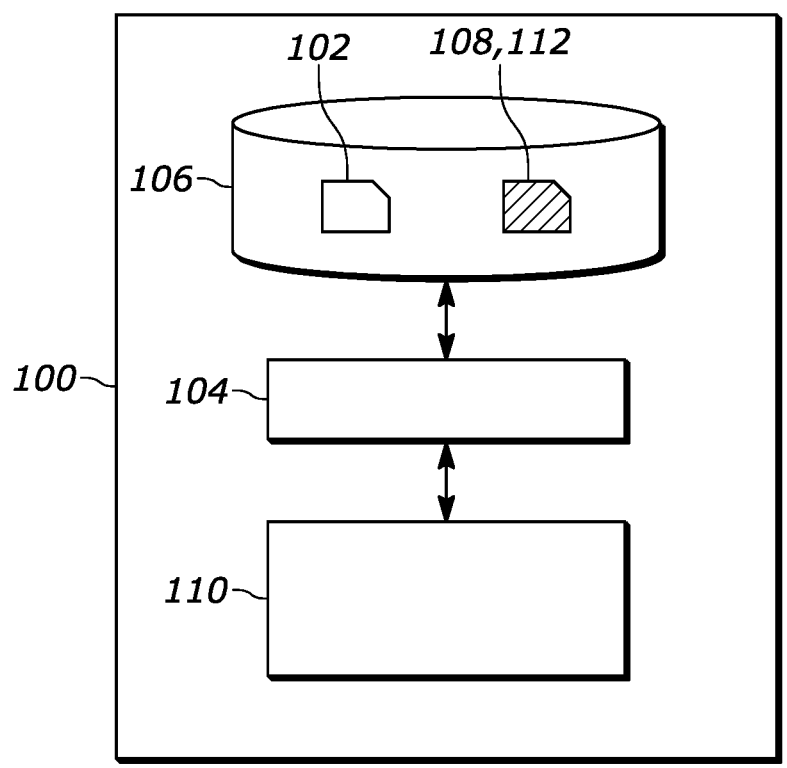
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the context of autonomous vehicles, the term "agent" can refer to objects or entities in the environment that surrounds or interacts with the autonomous vehicle. This includes pedestrians, other vehicles, cyclists, road signs, traffic lights, lane lines, and the like. Objects or features that are being detected by the autonomous vehicle's sensors for use in decision making in controlling the autonomous vehicle can be collectively referred to as agents.

This disclosure incorporates by reference, in its entirety, U.S. patent application Ser. No. 18/388,601, filed on the same day as tis disclosure, and titled "VISION-LANGUAGE-PLANNING (VLP) MODELS WITH AGENT-WISE LEARNING FOR AUTONOMOUS DRIVING."

Rapid advancements in autonomous driving technology have ushered in a new era of transportation, promising safer and more efficient journeys. Autonomous driving systems generally include three high-level tasks: (1) perception, (2) prediction, and (3) planning. Perception involves the vehicle's ability to understand and interpret its environment. This task includes various sub-components like computer vision, sensor fusion, and localization. Key elements of perception include object detection (e.g., identification and tracking agents external to the autonomous vehicle), localization (e.g., determining the vehicle's precise position and orientation in the world, often using GPS and other sensors), and sensor fusion (e.g., combining data from different sensors, such as cameras, lidar, radar, and ultrasonic sensors to build a comprehensive view of the surroundings). Prediction involves anticipating how other road users and agents in the environment will behave in the near future. This task often involves using machine learning models to estimate the trajectories and intentions of the agents, including pedestrians, other vehicles, and potential obstacles. Accurate prediction is crucial for making safe driving decisions. Planning involves determining the optimal path and actions for the autonomous vehicle to navigate its environment. This typically includes tasks like route planning, trajectory planning, and decision-making. The planning system considers information from perception and prediction to make decisions such as when to change lanes, when to stop at an intersection, how to react to unexpected events, and the like.

Figure 4:
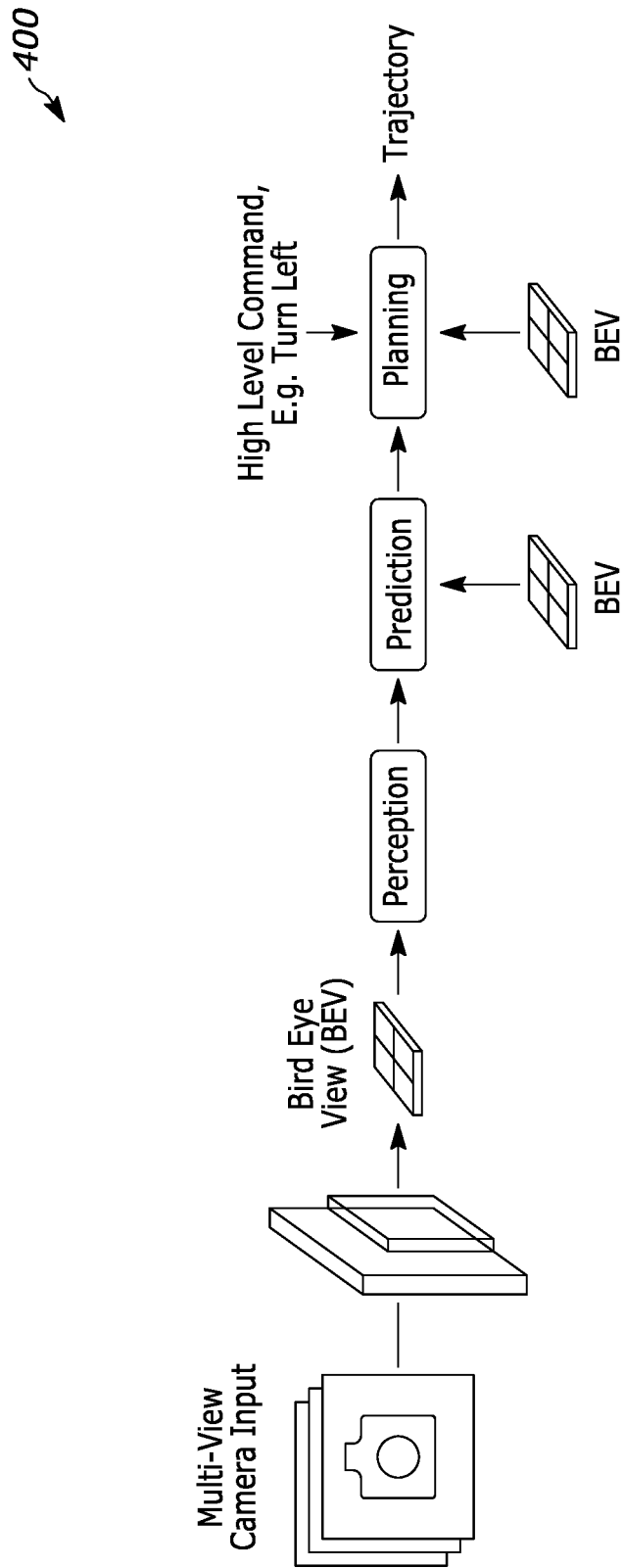
FIG. 4 shows a schematic overview of an end-to-end autonomous driving system, according to an embodiment.

A conventional approach for autonomous driving is to use standalone models in which each task (perception, prediction, and planning) is trained and optimized separately. However, such disjoint training and optimization can lead to severe error accumulation. To address this problem, end-to-end autonomous driving systems have been proposed and gained interest in recent years. End-to-end autonomous driving systems unifies all these tasks and perform joint optimization with a goal to facilitate and improve planning. In particular, end-to-end approaches leverages bird-eye-view (BEV) representation for all tasks in perception, prediction and planning modules. BEV is generated from multi-view camera input and contains spatiotemporal information about the scene. A computer vision system (e.g., camera, processor, memory, and machine learning models shown in FIG. 2) can derive the spatiotemporal information about the scene. Joint training and optimization strategy across all tasks in end-to-end autonomous driving have led to state-of-the-art result for autonomous driving. FIG. 4 (described more below) shows an overview of an end-to-end autonomous driving system. Central to the success of autonomous vehicles is the integration of diverse modalities that synergistically enhance perception, decision-making, and planning capabilities. In the Unified Autonomous Driving (UniAD) model, which is one of the recent end-to-end autonomous-driving works, the autonomous driving is structured by redefining the interplay between essential components and tasks. In UniAD, the emphasis shifts toward an optimized pursuit of the ultimate goal: effective planning for self-driving vehicles. This entails revisiting the core components of perception and prediction and reconfiguring their roles to synchronize with the overarching planning objective.

While significant progress has been made in computer vision for autonomous driving, a crucial dimension has remained unexplored: the fusion of language comprehension with vision-based planning systems. Foundation models, which are large pre-trained machine learning models trained on open world data, often involve language as one of the main modalities of the data. In foundation models, there is usually connection between language and other modalities. After pre-training, the foundation models can be adapted to a given task via fine-tuning. Foundation models have shown importance of incorporating language in achieving state-of-the-art performance and generalization across wide variety of tasks. Despite the immense success of foundation models across different domains, its extension to autonomous driving domain remains uncharted.

Therefore, according to various embodiments disclosed herein, this disclosure presents a Vision-Language-Planning (VLP) Foundation model to bridge this gap. In this VLP approach, language knowledge is utilized through a contrastive learning with vision model information during training to improve the planning and generalization capability of autonomous driving systems. A goal of this is to revolutionize the landscape of autonomous driving by seamlessly incorporating language understanding into the planning process. By harnessing the power of language foundation models in tandem with advanced computer vision techniques, the accuracy, safety, and generalization capacity of autonomous driving systems can be significantly elevated.

The integration of language comprehension capabilities provides tremendous potential for enhancing the future trajectory prediction of the self-driving car. Language models, with their exceptional proficiency in understanding and generating textual content, offers an avenue to interpret complex and nuanced contextual cues. As disclosed herein, this capability is leveraged to extract high-level semantic information from textual instructions, road signs, and other linguistic cues present in the environment. Consequently, the disclosed Vision-Language-Planning Foundation model will provide autonomous vehicles with an enriched perception of their surroundings, leading to more informed and contextually aware planning decisions.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106.

The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network: this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the "untrained" neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The system 100 shown in FIG. 1 is one example of a system that may be utilized to train the machine learning models described herein.

Figure 2:
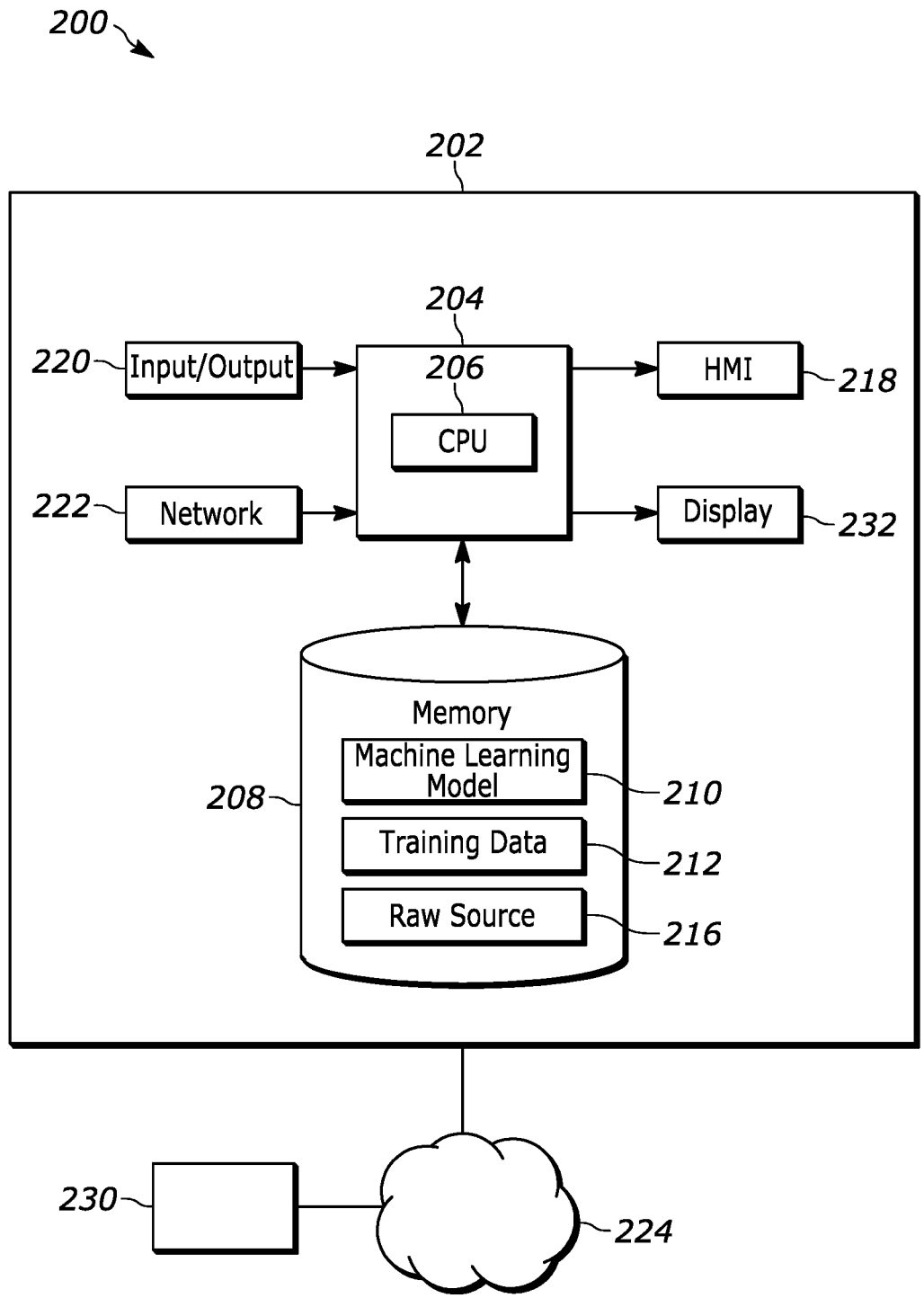
FIG. 2 shows a computer-implemented method for training and utilizing a neural network, according to an embodiment.

FIG. 2 depicts a system 200 to implement the machine-learning models described herein, for example the VLP Foundation model. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, touch screen, etc. Examples of output devices include monitors, touchscreens, speakers, head-up displays, vehicle control systems, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input. The computing system 202 may include a display device 232. The computing system 202 may include hardware and software for outputting graphics and text information to the display device 232. The display device 232 may include an electronic display screen, projector, speaker or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate one or more of the machine learning models described herein, including the VLP Foundation model.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified. The training dataset 212 may also include the text description of the scene (e.g., "the pedestrian is crossing the street") that corresponds to the images detected by the vehicle sensors.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data. In the context of the VLP model described herein, a loss between the predicted trajectory of the autonomous vehicle and the ground truth trajectory of the vehicle can be determined, and the VLP model can be trained to reduce this loss, e.g. to convergence.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of agents in video images, annotate the occurrences, and/or command the vehicle to take a specific action (planning) based on the locational data of the agent (perception) and the predicted future movement/location of the agent (prediction). The machine-learning algorithm 210 may be programmed to process the raw source data 216 to identify the presence of the particular features. The machine-learning algorithm 210 may be configured to identify a feature in the raw source data 216 as a predetermined feature (e.g., road sign, pedestrian, etc.). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera. And, as will be described further below with respect to the VLP Foundation model, the raw source data 216 can be natural language text information associated with the scene (e.g., "a car is entering the intersection from the left").

Figure 3:
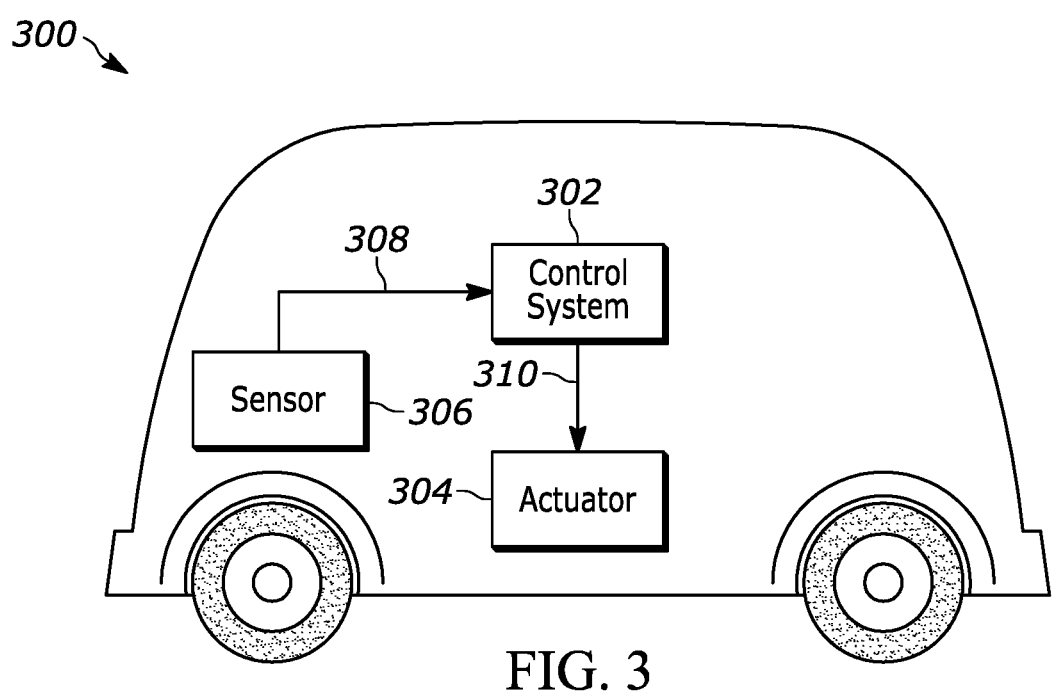
FIG. 3 shows a schematic diagram of a control system configured to control a vehicle, which may be a partially autonomous vehicle, a fully autonomous vehicle, a partially autonomous robot, or a fully autonomous robot, according to an embodiment.

FIG. 3 depicts a schematic diagram of control system 302 configured to control vehicle 300, which may be a partially autonomous vehicle or fully autonomous vehicle, partially autonomous robot or fully autonomous robot. The vehicle 300 and/or its control system 302 can incorporate one or more components of the system 200, such as computing system 202 in order to command an actuator 304 to perform a certain action based upon processing readings from one or more sensors 306. For example, control system 302 can be configured to utilize the VLP foundation model disclosed herein in order to control movement of the vehicle via actuator 304.

The one or more sensors 306 may include one or more image sensors (e.g., camera, video sensors, radar sensors, ultrasonic sensors, LiDAR sensors), and/or position sensors (e.g. GPS). The sensors 306 can be configured to generate raw source data 216. One or more of the one or more specific sensors may be integrated into vehicle 300. In the context of agent recognition and processing as described herein, the sensor 306 is a camera mounted to or integrated into the vehicle 300. Alternatively or in addition to one or more specific sensors identified above, sensor 306 may include a software module configured to, upon execution, determine a state of actuator 304.

In embodiments where vehicle 300 is a fully or partially autonomous vehicle, actuator 304 may be embodied in a brake, an accelerator, a propulsion system, an engine, a drivetrain, or a steering system (e.g., steering wheel) of vehicle 300. Actuator control commands may be determined such that actuator 304 is controlled such that vehicle 300 avoids collisions with detected agents, for example. Detected agents may also be classified according to what classifier deems them most likely to be, such as pedestrians or trees. The actuator control commands may be determined depending on the classification.

In other embodiments where vehicle 300 is a fully or partially autonomous robot, vehicle 300 may be a mobile robot that is configured to carry out one or more functions, such as flying, swimming, diving and stepping, via actuator 304. The mobile robot may be an at least partially autonomous lawn mower or an at least partially autonomous cleaning robot. In such embodiments, the actuator control command may be determined such that a propulsion unit, steering unit and/or brake unit of the mobile robot may be controlled such that the mobile robot may avoid collisions with identified objects.

FIG. 4 illustrates a high-level overview of an end-to-end autonomous driving system 400, according to an embodiment. The end-to-end system 400 may be incorporated into the vehicle 300, such as its computing system 202, in order to operate the vehicle to avoid objects or otherwise control the vehicle 300 based on the sensed environment about the vehicle 300.

Image input is received and passed through one or more ML (e.g., neural network) layers to create a BEV that represents the environment surrounding the vehicle. The BEV can be used as input to all three of the perception, prediction and planning modules. For example, the perception model utilizes computer vision based on input received from the image sensors, e.g., the BEV, in order to perform object detection and the like. The prediction model can include machine learning models configured to estimate the trajectories and intentions of the detected objects in the BEV based on those objects past movement, direction, and contextual information. The planning model can include route planning, trajectory planning, and decision-making for the vehicle to take to navigate relative to the other objects in the BEV, and turn those decisions into actions taken by the vehicle in real life.

The present disclosure introduces a Vision-Language-Planning (VLP) foundation model for autonomous driving. In embodiments, the VLP foundation model uses contrastive learning techniques, such as those introduced in a Contrastive Language-Image Pretraining (CLIP) model. Other contrastive learning models can be employed. As an example, an introduction to the CLIP model is provided, and then further description of the VLP follows.

CLIP was developed by OpenAI. It is designed to understand and connect images and natural language descriptions in a way that allows it to perform a wide range of vision and language tasks. CLIP employs a dual-encoder architecture, comprising a vision encoder and a text encoder, and a shared embedding space. The vision encoder processes images, while the text encoder processes natural language descriptions. The vision encoder, based on a vision model like a convolutional neural network (CNN), converts images into a fixed-length vector representation. The text encoder processes textual descriptions by converting them into a fixed-length vector representation. CLIP is a vision-language foundation model trained on open world data using contrastive learning. Contrastive learning is a type of machine learning where the model learns to distinguish between positive and negative pairs of data. In the context of CLIP, the "positive pair" consists of an image and a text description that are semantically related, while the "negative pair" consists of an image and a randomly selected text description that is not related. During training, CLIP is designed to encourage bringing together features from related text and images pairs into a common embedding space, while pushing unrelated pairs apart.

CLIP's shared embedding space allows for zero-shot learning. When presented with an image and a text prompt, CLIP can rank how well the image matches the prompt without specific training data for that particular task. CLIP can perform various vision-language tasks, including image classification, text-based image retrieval (e.g., retrieving images based on textual queries), image captioning, zero-shot object recognition, and others.

Figure 5:
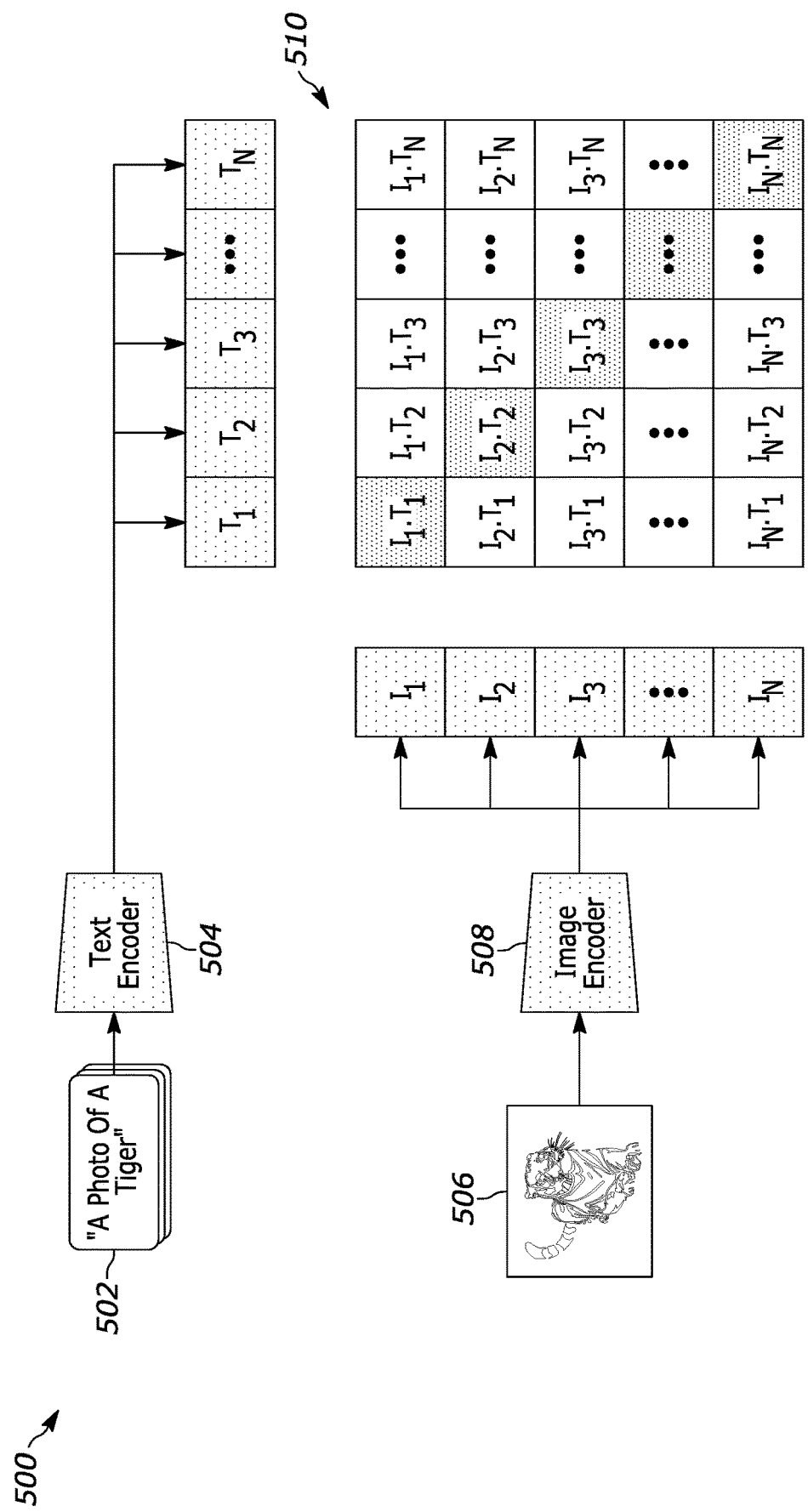
FIG. 5 shows a schematic overview of a contrastive learning model, according to an embodiment.

The contrastive learning concept used in CLIP (teachings of which are included in the VLP foundation model) is illustrated in FIG. 5, generally shown as a contrastive learning model at 500. As shown, a plurality of natural language text descriptions 502 are fed into a text encoder 504, and a plurality of images 506 are fed into an image encoder 508. The model 500 then performs feature mapping, where the vectors output by the encoders are mapped to a joint embedding space. For example, an image vector output by the image encoder (e.g., of a size 1×256) is matched to a corresponding text vector output by the text encoder (e.g., of a size 1×256). The model then performs a dot product between a batch of image and text features to get the similarity between these vectors, shown generally at 510

Referring to the example embodied in FIG. 5, a plurality of images 506 (one of which being an image of a tiger in this example) are fed into image encoder 508, and a plurality of text phrases 502 (one of which being something like "a photo of a tiger" in this example) is fed into text encoder 504. Several irrelevant or dissimilar text phrases and images are also fed into the encoders. For example, images of objects that are not tigers are fed into the image encoder 508, and phrases that have nothing to do with tigers are also fed into the text encoder 504. The image encoder produces an image vector having features $I_1, I_2, \ldots, I_N$ while the text encoder produces a text vector having features $T_1, T_2, \ldots, T_N$. The diagonal of the resulting matrix 510 from this dot product shows paired image and text according to their likely similarity, while the off-diagonal represent unpaired image and text features (e.g., an image of a cat and a text description like "a picture of a dog").

As such, the contrastive learning model brings the image and text embeddings closer together when they correspond to each other, and pushes them apart when they do not. In other words, referring to FIG. 5, during training, the contrastive learning model aims to increase the similarity of diagonal elements (i.e. positive pairs), while decreasing the similarity between off-diagonal elements. As another example, during training, if the model is provided with an image of a cat and a text description like "a picture of a cat"), the model aims to minimize the distance (similarity) between the image and text embeddings in the shared space; conversely, if the model is provided with an image of a cat and a text description like "a picture of a dog," the model aims to maximize the distance (dissimilarity) between their embeddings. This contrastive training objective encourages the model to learn to understand the semantic relationships between images and text. It is a way to teach the model to associate matching image-text pairs closely and distinguish non-matching pairs effectively. The result is a shared embedding space where similar pairs cluster together, and dissimilar pairs are far apart.

Figure 6:
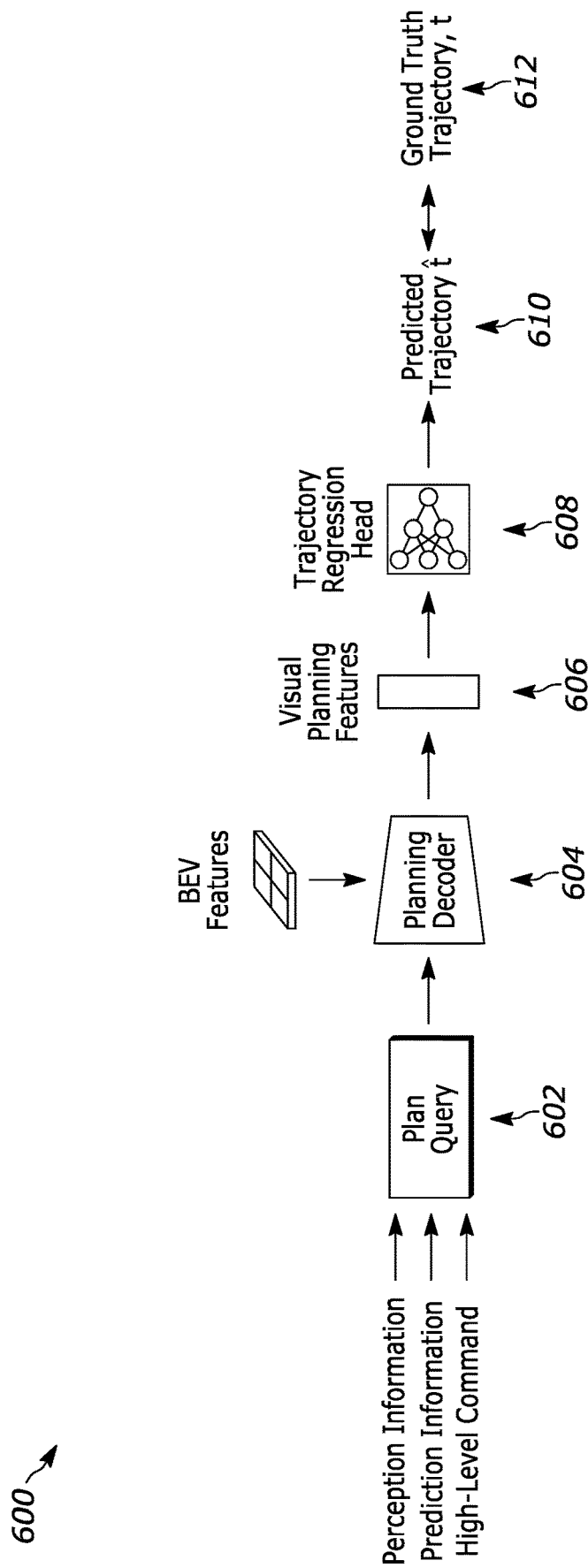
FIG. 6 shows a schematic overview of a planning model for use in the end-to-end autonomous driving system, according to an embodiment.

FIG. 6 illustrates a high-level overview of a planning model 600 in the end-to-end autonomous driving system 400 of FIG. 4, according to an embodiment. As illustrated, the planning features are used in predicting the future trajectory for self-driving car. For example, a planning query 602 (also referred to as a planning model) can contain both perception information and prediction information as illustrated in FIG. 4. The planning query is a concatenation of information from the perception module, prediction module, and high-level commands. The planning query is configured to extract planning information by utilizing the BEV feature map. In other words, using the BEV and all of the data thereon as determined from the perception and prediction models, the planning model plans an appropriate route of the vehicle. To do so, features of the BEV are sent to a planning decoder 604 to obtain visual planning features 606, also referred to as vision-based planning features. For example, a 1×256 vector can be derived. The planning decoder can be a model that extracts visual planning features using the planning query and BEV features. The features extracted from the BEV can include information about the agents in the environment, such as their location, their trajectory, and the like as described above, which are inputs to determine how the autonomous vehicle itself should react. The extracted planning features are further sent into a trajectory regression head 608 to plan the future trajectory for the self-driving car in the next P timestamps. The trajectory regression head 608 can be used to transform the vector into another size vector. In an embodiment, the trajectory regression head 608 includes a small neural network that maps high dimensional input to the expected P timestamps trajectory. During the training process, it applies two kinds of planning losses to optimize the planning module. One is the average distance error (ADE) which aims to reduce the distance or loss between the predicted trajectory 610 and the ground truth trajectory 612, the other is the collision rate (COL) which aims to ensure the safety of the planned trajectory.

In general, the planning model 600 can be represented as follows:

$$\text{plan\_feat}_{visual} = PlanDecoder(\text{plan\_query}, \text{bev\_feat}),$$

$$plan_{pred} = TrajRegHead(\text{plan\_feat}_{visual}),$$

$$\text{Loss}_{plan} = ADE(plan_{pred}, plan_{gt}) + COL(plan_{pred}, bbox_{agent_{fut}}),$$

where $\text{plan\_feat}_{visual}$ represents visual planning features, bev_feat represents bird eye view features, $plan_{pred}$ represents predicted trajectory, TrajRegHead indicates the Trajectory Regression Head, $plan_{gt}$ represents ground truth trajectory and $bbox_{agent_{fut}}$ indicates the position and occupancy of the agents around the self-driving car in the future.

As explained above, this disclosure proposes applying both visual and language clues to enrich the planning information so as to produce better future trajectory for the self-driving car. Therefore, according to embodiments, the proposed VLP foundation model includes the addition of a formulated sentence or phrase to describe the environment and/or situation of the self-driving car and its surrounding agents. The phrase or sentence can be text-based, for example. The phrase or sentence can include a high-level ground truth meta data such as navigation command, ground truth trajectory, a description of the scene, and the like, and in this phase such ground truth meta data is available as part of the training data. For example, the language input can be: text_prompt="The autonomous self-driving car is {going straight} in an urban area located in {Singapore Onenorth}. The scene description is {Several moving pedestrians, parked cars, and motorcycle}." And, because the human with knowledge of the training data knows the future trajectory of the autonomous vehicle, the language input can also include, for example, "The future trajectory of the autonomous self-driving car for the next 6 timestamps will be {[[x1,y1], [x2,y2], [x3, y3], [x4, y4], [x5, y5], [x6, y6]]}" where x and y represent locational coordinates of the vehicle.

Figure 7:
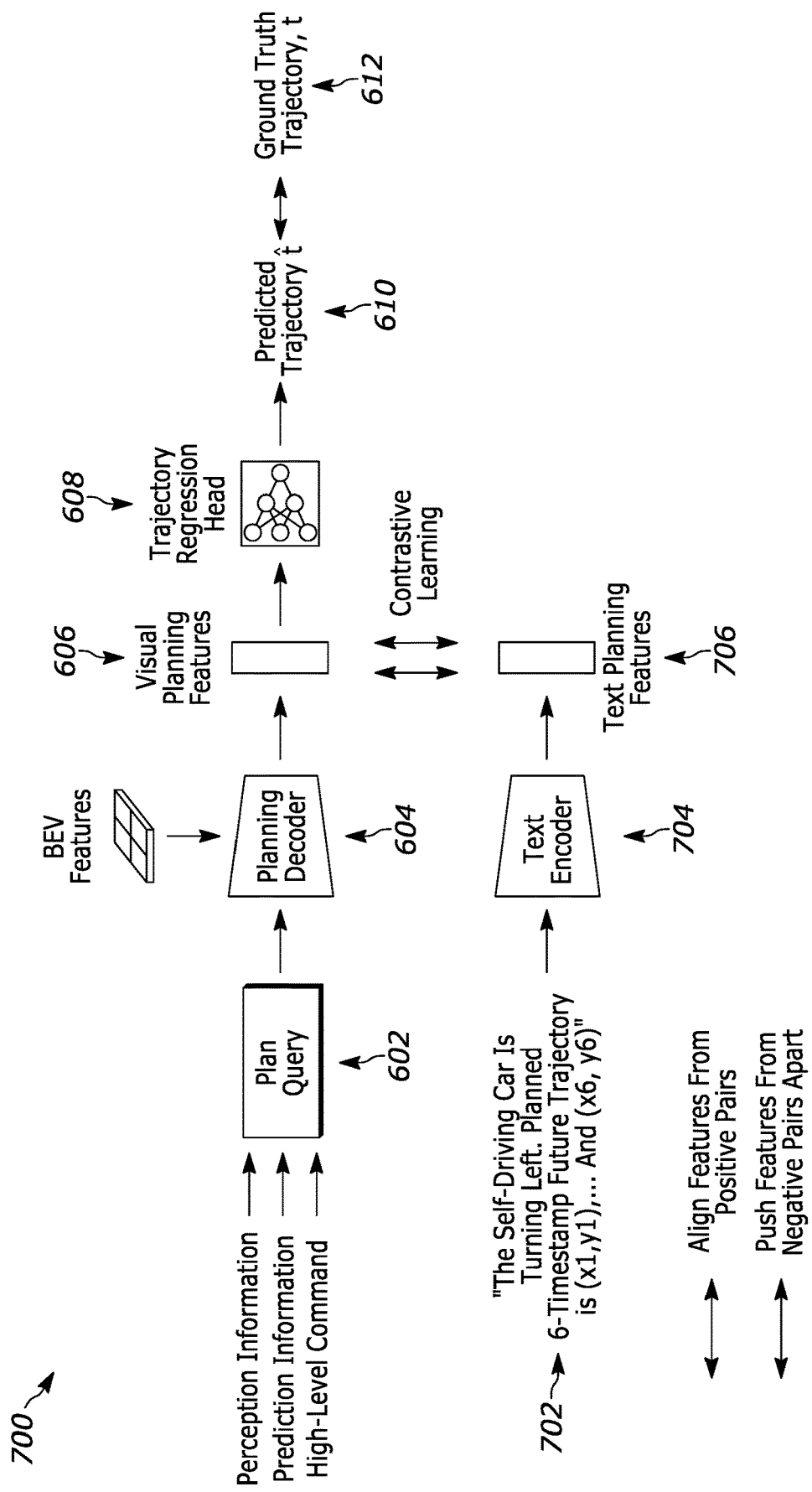
FIG. 7 shows a schematic overview of a vision-language planning (VLP) foundation model, according to an embodiment.

FIG. 7 illustrates one example of a vision-language planning (VLP) foundation model 700, according to an embodiment. The VLP foundation model 700 can be incorporated into the end-to-end model 400 of FIG. 4, for example. In the VLP foundation model 700, the plan query 602, planning decoder 604, visual planning features 606, trajectory regression head 608, predicted trajectory 610 and ground truth trajectory 612 are similar to those described above with reference to FIG. 6. What differs from this planning model 700 compared to that in FIG. 6 is the inclusion of the text inputs 702, text encoder 704, and text planning features 706, with contrastive learning taking place between the text planning features 706 and the visual planning features 606 that can be performed as described above with reference to FIG. 5 (e.g., CLIP). For example, a text phrase can be composed using a template and ground truth information, such as ground truth trajectory or high-level commands existing in the training data. This can be used as the text input 702. For example, "the self-driving car is turning left, and its future trajectory is (x1,y1), . . . (x6,y6)" can be generated based on the ground truth information related to the scene that already exists in the training data: the format of the natural language sentence can be based on a template. Several text entries can be provided for a corresponding number of video or images. With more self-driving related and detailed information included in the sentence, the language path can provide more high-level semantic and comprehensive clues for the planning module. And, as explained above with reference to FIG. 5, several irrelevant text strings can also be provided for training purposes.

The text encoder 704 is configured to operate similar to text encoder 504. In embodiments, the text encoder 704 is configured to extract high-level language features as the planning text features 706, also referred to as text-based planning features.

Since the visual planning feature is used for future trajectory prediction, the information in the visual planning features 606 should be aligned with the text planning features 706. Therefore, with the planning text feature and the planning visual feature, the system performs contrastive learning between the two modes. Contrastive learning is used to compare the visual planning features 606 with the text planning features 706. As explained above, the contrastive learning utilizes a shared embedding space, and the model learns to distinguish between positive and negative pairs of data. In the context of CLIP and other contrastive learning models, the "positive pair" consists of an image and a text description that are semantically related, while the "negative pair" consists of an image and a randomly selected text description that is not related. During training, the contrastive learning model is designed to encourage bringing together features from related text and images pairs into a common embedding space, while pushing unrelated pairs apart. The contrastive loss (ContraLoss) is additionally included in the final loss in the training process. This results in a closer, improved relationship between the predicted trajectory 610 and the ground truth trajectory 612.

The process shown in FIG. 7 can be represented as follows:

$$\text{plan\_feat}_{text} = TextEncoder(\text{text\_prompt}),$$

$$\text{plan\_feat}_{visual} = PlanDecoder(\text{plan\_query}, \text{bev\_feat}),$$

and $$\text{Loss}_{plan} = ContraLoss(\text{plan\_feat}_{visual}, \text{plan\_feat}_{text}) +$$

$$ADE(\text{plan}_{pred}, \text{plan}_{gt}) + COL(\text{plan}_{pred}, \text{bbox}_{agent_{fut}})$$

where plan_feat$_{text}$ represents text features for planning. In VLP, text features supervise the planning features during training time to achieve better predicted trajectory and generalization performance for self-driving-car.

Figure 8:
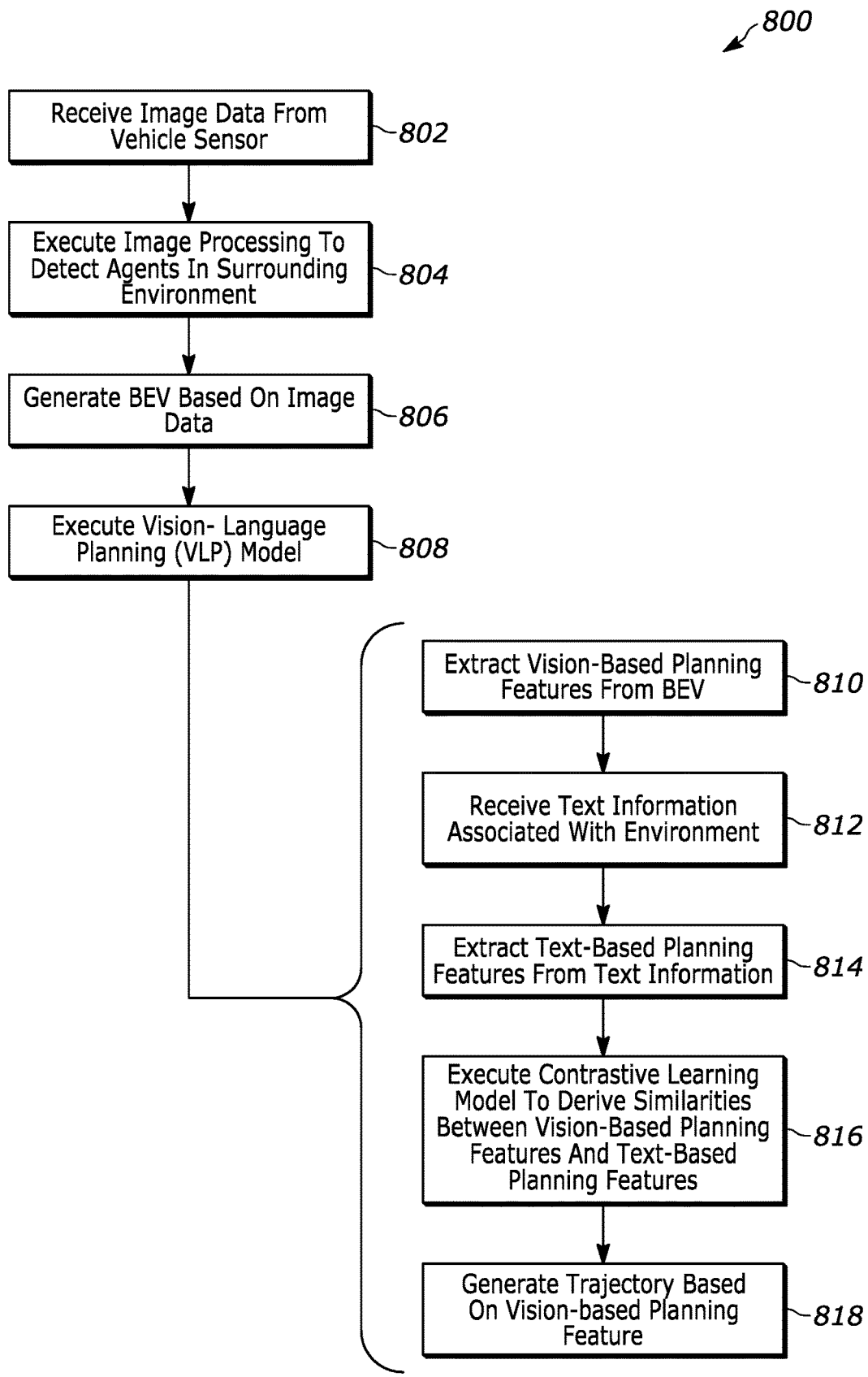
FIG. 8 shows a schematic of a method of training an autonomous driving system utilizing a vision-language planning (VLP) machine learning model, according to an embodiment.

FIG. 8 illustrates a method 800 of training an autonomous driving system utilizing a vision-language planning (VLP) machine learning model, according to an embodiment. The method can be carried out by one or more of the processors disclosed herein. At 802, image data is generated from a camera mounted to a vehicle. For example, this camera can be one of the sensors 306 described above. The generated image data includes agents in an environment or scene outside of the vehicle.

At 804, image processing is executed on the image data in order to detect agents in the environment. Object recognition and classification can be used, as explained above. At 806, a BEV is generated based on the image data, and the results of the object recognition or other object detection. The BEV includes spatiotemporal information associated with the vehicle and the detected agents.

At 808, a vision-language planning (VLP) machine learning model is executed. During execution of the VLP model, at 810 vision-based planning features are extracted from the BEV. These planning features include the spatiotemporal information associated with the vehicle. At 812, text information is generated associated with the environment. For example, a template can be used along with the ground truth data associated with the environment to populate a text string, sentence, or the like. This text described qualities of the vehicle in the environment, such as "the vehicle is turning left." At 814, text-based planning features are extracted from the text information. Then at 816, a contrastive learning model is executed in order to derive similarities between the vision-based planning features and the text-based planning features. At 818, a predicted trajectory of the vehicle is generated based on these similarities, based on the vision-based planning features. Then, the model is refined, updated, and trained once again, and more feature space is determined based on the similarities.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A method of training an autonomous driving system utilizing a vision-language planning (VLP) machine learning model, the method comprising:
   receiving image data generated from a camera mounted to a vehicle, wherein the image data includes agents in an environment outside the vehicle;
   via image processing, detecting the agents in the environment based on the image data;
   generating a bird eye view (BEV) of the environment based on the image data, wherein the BEV includes spatiotemporal information associated with the vehicle and the detected agents; and
   executing a vision-language planning (VLP) machine learning model to:

extract vision-based planning features from the BEV, wherein the vision-based planning features include the spatiotemporal information associated with the vehicle, generate text information associated with the environment, wherein the text information describes qualities of the vehicle in the environment;

extract text-based planning features from the text information, execute a contrastive learning model to derive similarities between the vision-based planning features and the text-based planning features, and generate a predicted trajectory of the vehicle based on the similarities.

2. The method of claim 1, further comprising:
determining a loss between the predicted trajectory of the vehicle and a ground truth trajectory of the vehicle; and
repeat the steps of claim 1 until convergence to minimize the loss.

3. The method of claim 1, wherein the text information is generated using a template and ground truth information associated with the environment existent in training data.

4. The method of claim 1, wherein an output of the contrastive learning is used as a training loss for training the VLP machine learning model.

5. The method of claim 1, wherein the contrastive learning model includes:
a text encoder configured to output a text-based vector representing text-based features associated with the text information of the environment; and
an image encoder configured to output an image-based vector representing image-based features associated with the detected agents in the BEV.

6. The method of claim 5, wherein the contrastive learning model is further configured to execute a dot product to evaluate similarities between the text-based vector and the image-based vector.

7. The method of claim 1, wherein the contrastive learning model is further configured to push apart dissimilarities between the vision-based planning features and the text-based planning features.

8. The method of claim 1, wherein the agents in the environment include at least one of a pedestrian, another vehicle, or a cyclist.

9. A system utilizing a vision-language planning (VLP) machine learning model, the system comprising:
a camera mounted to a vehicle and configured to generate image data associated with agents in an environment outside the vehicle;
a processor; and
memory including instructions that, when executed by the processor, cause the processor to:
process the image data to detect the agents in the environment,
generate a bird eye view (BEV) of the environment based on the image data, wherein the BEV includes spatiotemporal information associated with the vehicle and the detected agents, and
execute a vision-language planning (VLP) machine learning model to:
extract vision-based planning features from the BEV, wherein the vision-based planning features include the at least some of the spatiotemporal information associated with the vehicle,
receive text information associated with the environment, wherein the text information describes qualities of the vehicle in the environment,
extract text-based planning features from the text information,
execute a contrastive learning model to derive similarities between the vision-based planning features and the text-based planning features, and
generate a predicted trajectory of the vehicle based on the similarities.

10. The system of claim 9, wherein the memory includes further instructions that, when executed by the processor, cause the processor to:
determine a loss between the predicted trajectory of the vehicle and a ground truth trajectory of the vehicle; and
execute the VLP model until convergence to minimize the loss.

11. The system of claim 9, wherein the text information is generated using a template and ground truth information associated with the environment existent in training data.

12. The system of claim 9, wherein an output of the contrastive learning is used as a training loss for training the VLP machine learning model.

13. The system of claim 9, wherein the contrastive learning model includes:
a text encoder configured to output a text-based vector representing text-based features associated with the text information of the environment; and
an image encoder configured to output an image-based vector representing image-based features associated with the detected agents in the BEV.

14. The system of claim 13, wherein the contrastive learning model is further configured to execute a dot product to evaluate similarities between the text-based vector and the image-based vector.

15. The system of claim 9, wherein the contrastive learning model is further configured to push apart dissimilarities between the vision-based planning features and the text-based planning features.

16. The system of claim 9, wherein the agents in the environment include at least one of a pedestrian, another vehicle, or a cyclist.

17. A method of training an autonomous driving system, the method comprising:
receiving image data generated from a camera mounted to a vehicle, wherein the image data includes agents in an environment outside the vehicle;
generating a bird eye view (BEV) of the environment based on the image data, wherein the BEV includes spatiotemporal information associated with the vehicle and the agents;
based on the BEV, executing a perception model to detect the agents in the environment and associated information about the detected agents;
based on the BEV, executing a prediction model to estimate trajectories of the detected agents;
based on the BEV, executing a vision-language planning (VLP) model to output a predicted trajectory of the vehicle, wherein the VLP model is configured to:
extract vision-based planning features from the BEV, wherein the vision-based planning features include the spatiotemporal information associated with the vehicle,
receive text information associated with the environment, wherein the text information describes qualities of one or more of the agents in the environment,
extract text-based planning features from the text information, perform contrastive learning to derive similarities between the vision-based planning features and the text-based planning features, and output the predicted trajectory based on the similarities.

18. The method of claim 17, wherein the text information is generated using a template and ground truth information associated with the environment existent in training data.

19. The method of claim 17, wherein an output of the contrastive learning is used as a training loss for training the VLP machine learning model.

20. The method of claim 17, wherein the agents in the environment include at least one of a pedestrian, another vehicle, or a cyclist.

* * * * *